US012420496B2

(12) United States Patent
Wadsworth et al.

(10) Patent No.: US 12,420,496 B2
(45) Date of Patent: Sep. 23, 2025

(54) METHOD FOR USING EXPENDABLE FLEXURES FOR FORMING COMPOSITE LAMINATES

(71) Applicant: Spirit AeroSystems, Inc., Wichita, KS (US)

(72) Inventors: Mark Anthony Wadsworth, Wichita, KS (US); Robert Raymond Meinders, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 128 days.

(21) Appl. No.: 18/121,962

(22) Filed: Mar. 15, 2023

(65) Prior Publication Data

US 2024/0308156 A1  Sep. 19, 2024

(51) Int. Cl.
*B29C 70/38* (2006.01)
*B29C 70/34* (2006.01)

(52) U.S. Cl.
CPC .......... *B29C 70/388* (2013.01); *B29C 70/342* (2013.01)

(58) Field of Classification Search
CPC .............................. B29C 70/44; B29C 70/541
USPC ....................................................... 156/242
See application file for complete search history.

(56) References Cited

U.S. PATENT DOCUMENTS

| 7,959,753 | B2 | 6/2011 | Nunez Delgado et al. |
| 8,715,561 | B2 | 5/2014 | Levers et al. |
| 9,604,413 | B2 | 3/2017 | Levers et al. |
| 10,919,240 | B2 | 2/2021 | Rotter et al. |
| 2015/0352795 | A1* | 12/2015 | Coxon ................. B29C 70/541 425/389 |
| 2017/0087782 | A1 | 3/2017 | Kline et al. |
| 2018/0281269 | A1 | 10/2018 | Sundquist et al. |
| 2022/0072816 | A1* | 3/2022 | Yousefpour ............ B29C 35/02 |

OTHER PUBLICATIONS

Partial European Search Report, Europe Patent Application No. 24163080.5, dated Sep. 5, 2024, 14 pages, European Patent Office, Munich, Germany.

* cited by examiner

*Primary Examiner* — Abbas Rashid
*Assistant Examiner* — Gregory C. Grosso
(74) *Attorney, Agent, or Firm* — Stinson LLP

(57) ABSTRACT

A system and method for forming a composite part with multiple bends or curves, including placing an unformed composite laminate material onto a flexure and placing the flexure onto an engagement surface of a first forming tool. The flexure is a sheet of bendable material. The first forming tool has a first side surface, the first engagement surface, and a first corner between these surfaces. The flexure may have at least one thinned region aligned with the first corner. The method further includes sealing an impermeable membrane around the unformed composite laminate material, the flexure, and at least a portion of the first forming tool and heating them in an oven or autoclave. The method also includes applying a pressure differential to the impermeable membrane, pressing the unformed composite material and/or the flexure against the first side surface and to press the thinned region against the first corner.

19 Claims, 14 Drawing Sheets

METHOD FOR USING EXPENDABLE FLEXURES FOR FORMING COMPOSITE LAMINATES

BACKGROUND

Thermoplastic composite components are used in aircrafts and other parts requiring a combination of structural strength and heat resistance. Thermoplastic composite components can include thermoplastic composite laminates formed from a plurality of composite plies using heat in an oven or an autoclave and consolidating pressure (e.g., compressed together via a vacuum bag surrounding the composite plies).

Oven and autoclave forming of composite parts traditionally requires that the part be mostly positioned into the approximate desired shape before bagging the composite laminate to its forming tool. Otherwise, wrinkling often occurs when the vacuum bag acts on edges of the composite plies and/or the composite plies are prematurely compacted and not able to slip upon one another. Alternatively, bridging can occur when the composite plies touch the forming tool on both sides of a female radius, causing friction that reduces the ability of the composite plies to slide fully into the female radius or a corner therein. In some embodiments, the vacuum bag can also get between the forming tool and the composite plies, causing configuration control defects.

Any of the above-referenced problems can cause defective composite parts that are not functional and must be replaced or repaired. These defects are most likely to occur when forming a composite part having multiple curves or complex curvatures, such as stringers having channels with a generally trapezoid-shaped cross-section or Z-stringers as known in the art of aerospace manufacturing.

Thus, there is a need for improved composite part forming techniques that do not suffer from these and other disadvantages of the prior art.

SUMMARY

In some embodiments of the invention, a system for forming a composite part with multiple bends or curves includes an unformed composite laminate material having stacked plies, a matrix and opposing side edges, as well as a flexure over which the unformed composite laminate is laid, a first forming tool, and an impermeable membrane. The flexure is a sheet of yieldable or bendable material (such as a metal sheet) with a higher melt temperature than the matrix. The first forming tool has a first corner, a first engagement surface, and a first side surface separated from the first engagement surface by the first corner. The unformed composite laminate material and the flexure is placed onto the first forming tool such that a portion of a surface of the flexure is positioned onto the engagement surface of the first forming tool. In some embodiments, the impermeable membrane (e.g., a vacuum bag) is sealed around the unformed composite laminate material, the flexure, and at least a portion of the first forming tool. When placed under a pressure differential, the impermeable membrane presses at least one portion of the unformed composite material and at least one portion of the flexure against the first side surface and presses at least one region of the flexure against the first corner of the first forming tool.

In other embodiments of the invention, a method for forming a composite part with multiple bends or curves includes a step of placing an unformed composite laminate material having a matrix and opposing side edges onto a flexure and placing the flexure onto an engagement surface of a first forming tool. The flexure is a sheet of yieldable or bendable material with opposing side edges and a higher melt temperature than the matrix, wherein the unformed composite laminate material is laid over the flexure. The method also includes a step of placing the flexure onto an engagement surface of a first forming tool. The first forming tool has a first corner, the first engagement surface, and a first side surface separated from the first engagement surface by the first corner. The method also includes a step of sealing an impermeable membrane around the unformed composite laminate material, the flexure, and at least a portion of the first forming tool and applying a pressure differential to the impermeable membrane, thereby causing the impermeable membrane to press at least one portion of the unformed composite material and at least one portion of the flexure against the first side surface and to press at least one region of the flexure against the first corner the first forming tool.

In yet another embodiment, a method for forming a composite part with multiple bends or curves includes a step of placing an unformed composite laminate material having a matrix and opposing side edges onto a flexure and placing the flexure onto an engagement surface of a first forming tool. The flexure is a sheet of yieldable or bendable material with opposing side edges and a higher melt temperature than the matrix, and the first forming tool has a first corner, the first engagement surface, and a first side surface separated from the first engagement surface by the first corner. In this embodiment, the flexure has at least one thinned region having a reduced thickness in comparison with regions adjacent to the thinned regions and the flexure is placed onto the engagement surface with the at least one thinned region aligned with the first corner. The method further includes the steps of sealing an impermeable membrane around the unformed composite laminate material, the flexure, and at least a portion of the first forming tool and heating the unformed composite laminate material, the flexure, the impermeable membrane, and the first forming tool to a melt point of the matrix in an oven or autoclave. The method also includes a step of applying a pressure differential to the impermeable membrane, thereby causing the impermeable membrane to press at least one portion of the unformed composite material and at least one portion of the flexure against the first side surface and to press the thinned region of the flexure against the first corner of the first forming tool. The thinned regions each form a line of weakness or a living hinge at which the flexure bends when the pressure differential is applied to the impermeable membrane.

This summary is intended to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in more detail below with reference to the attached drawing figures, wherein.

Figure 7:
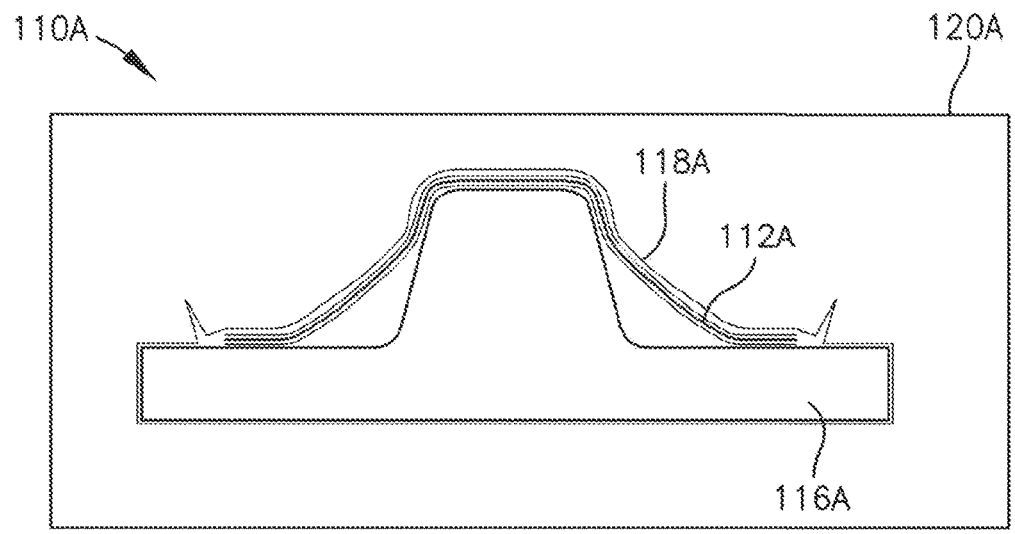
Figure 8:
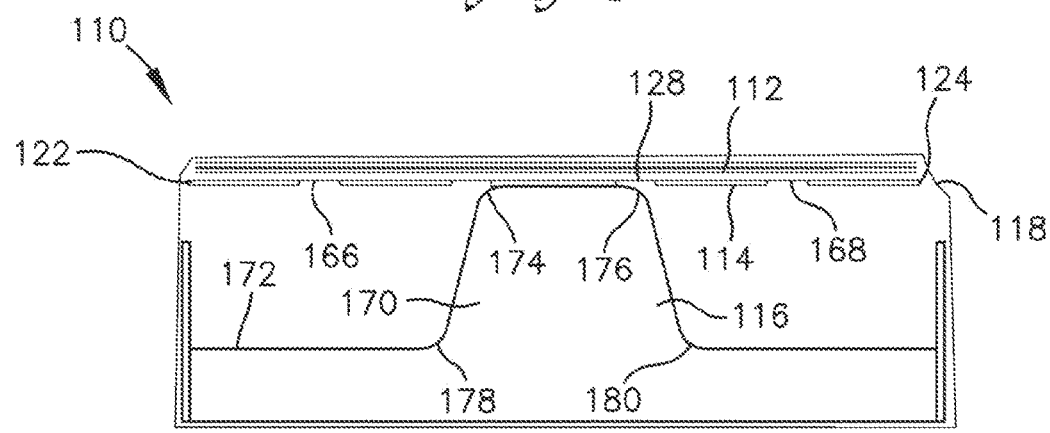
Figure 9:
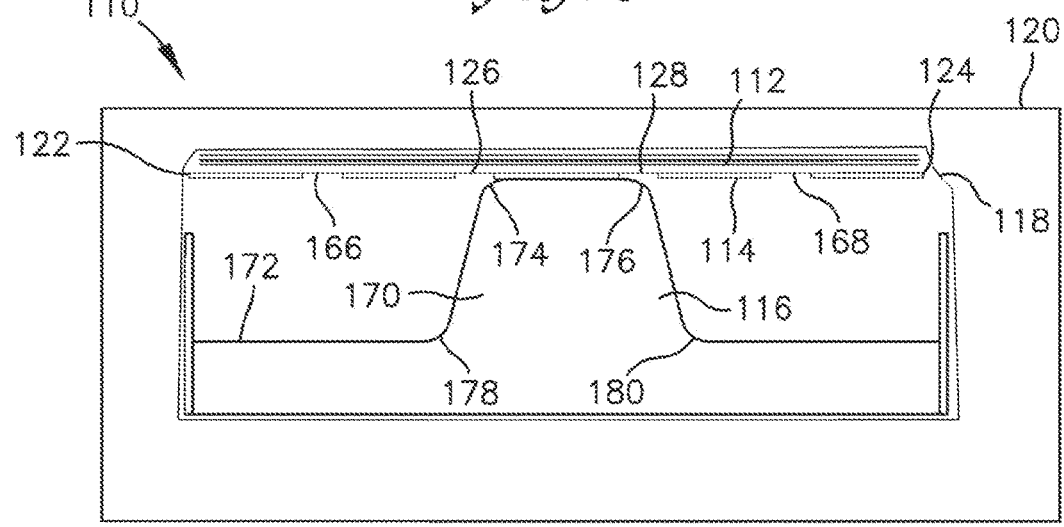
Figure 10:
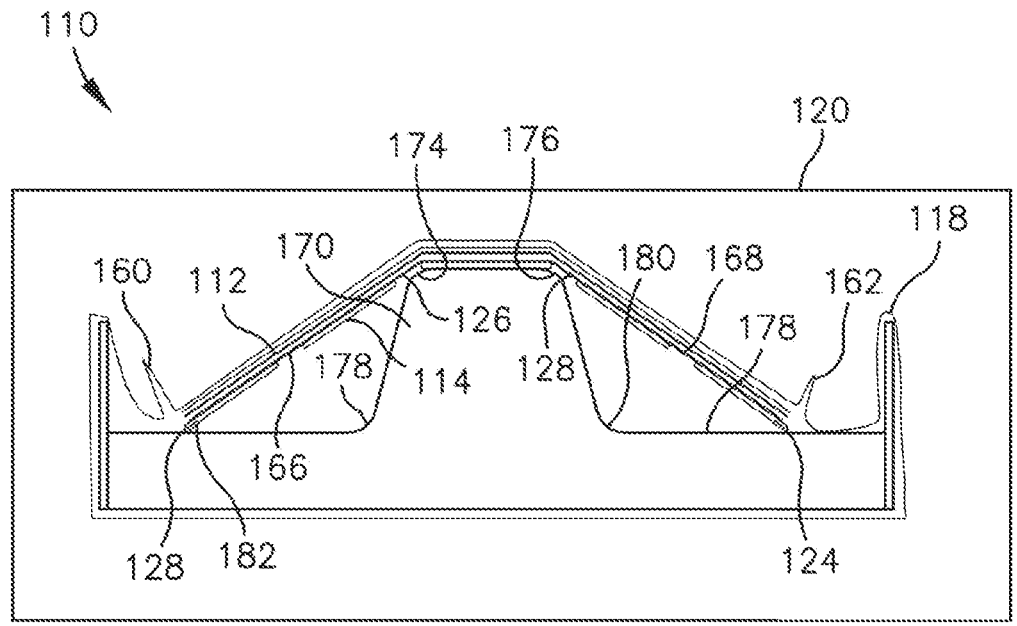
Figure 11:
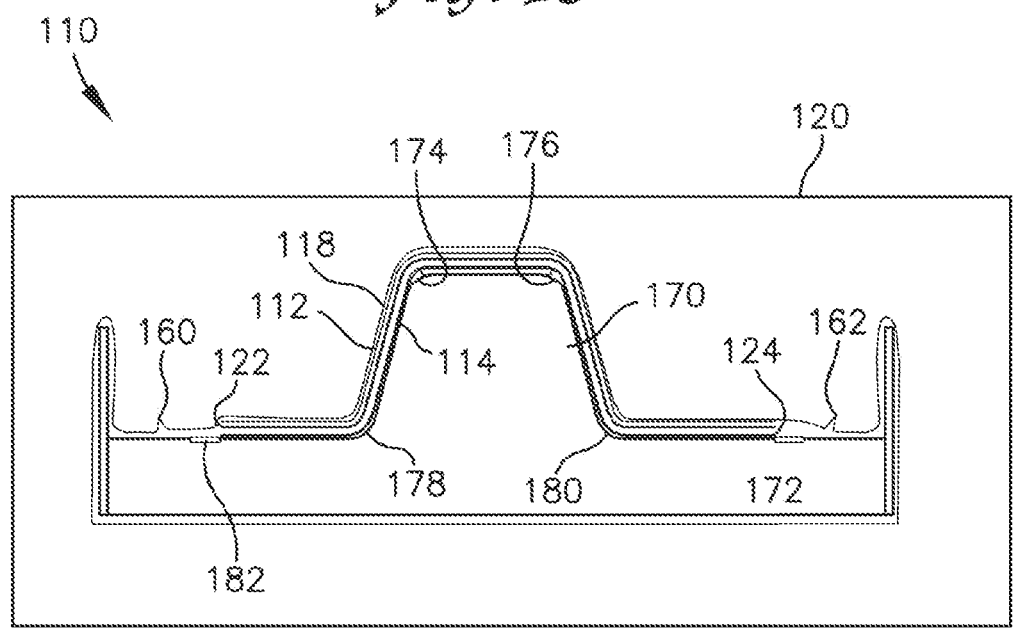
Figure 12:
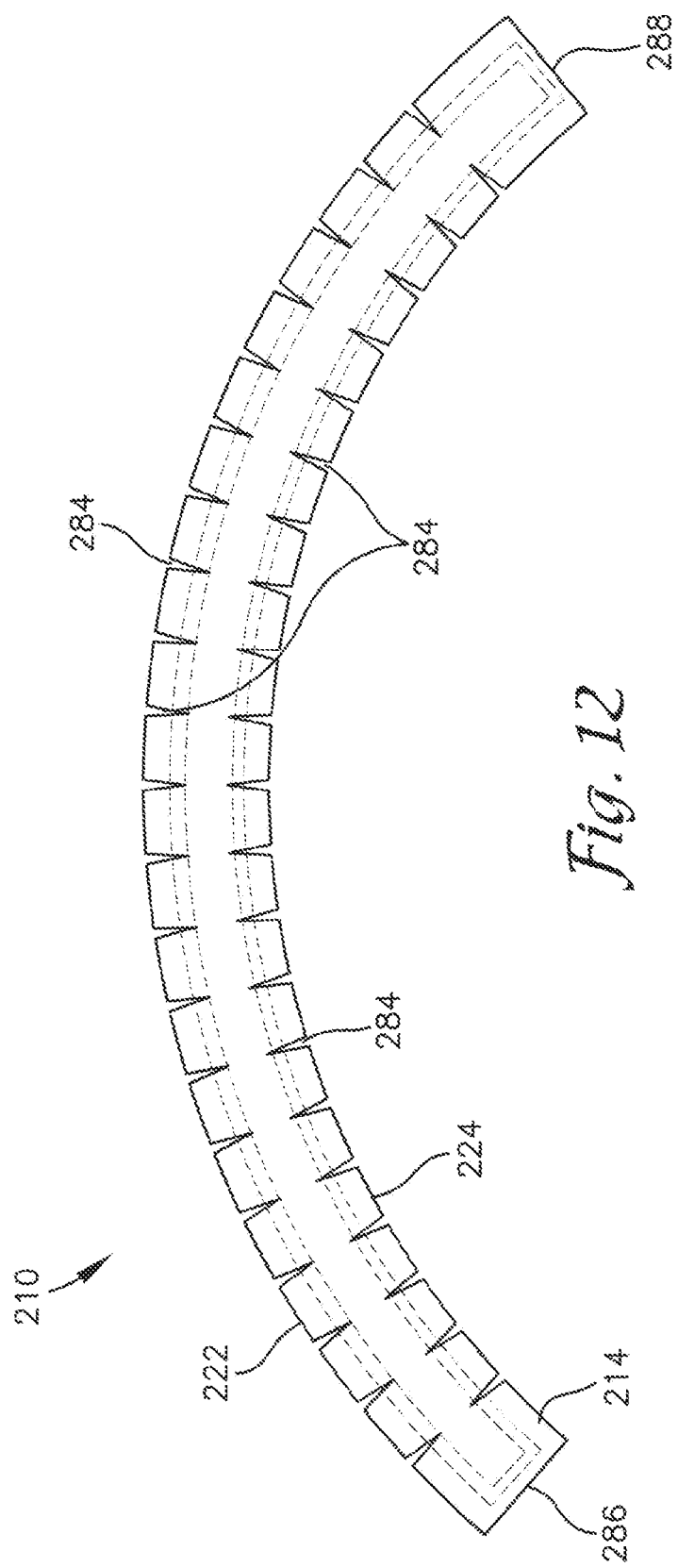
Figure 13:
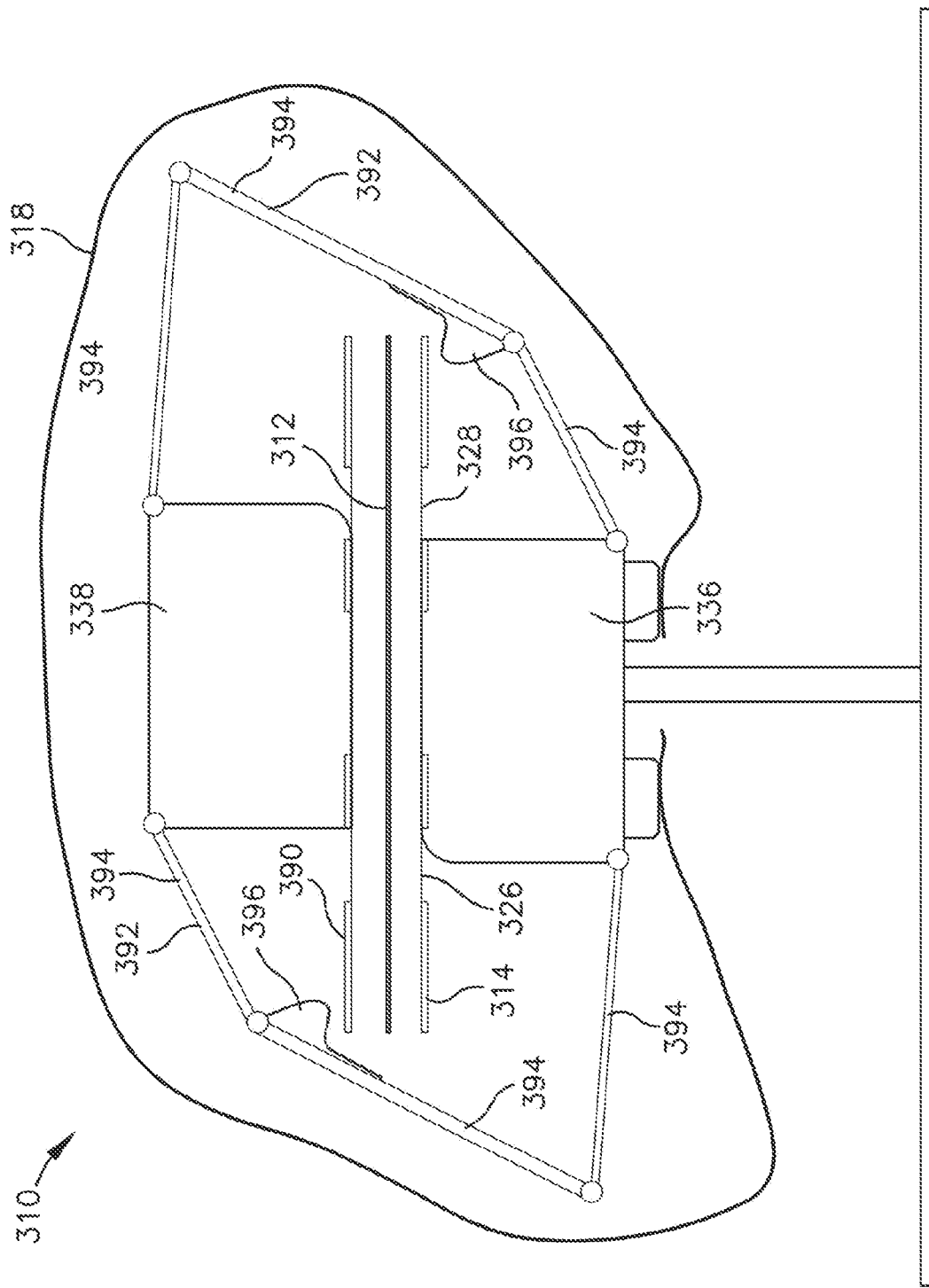
Figure 14:
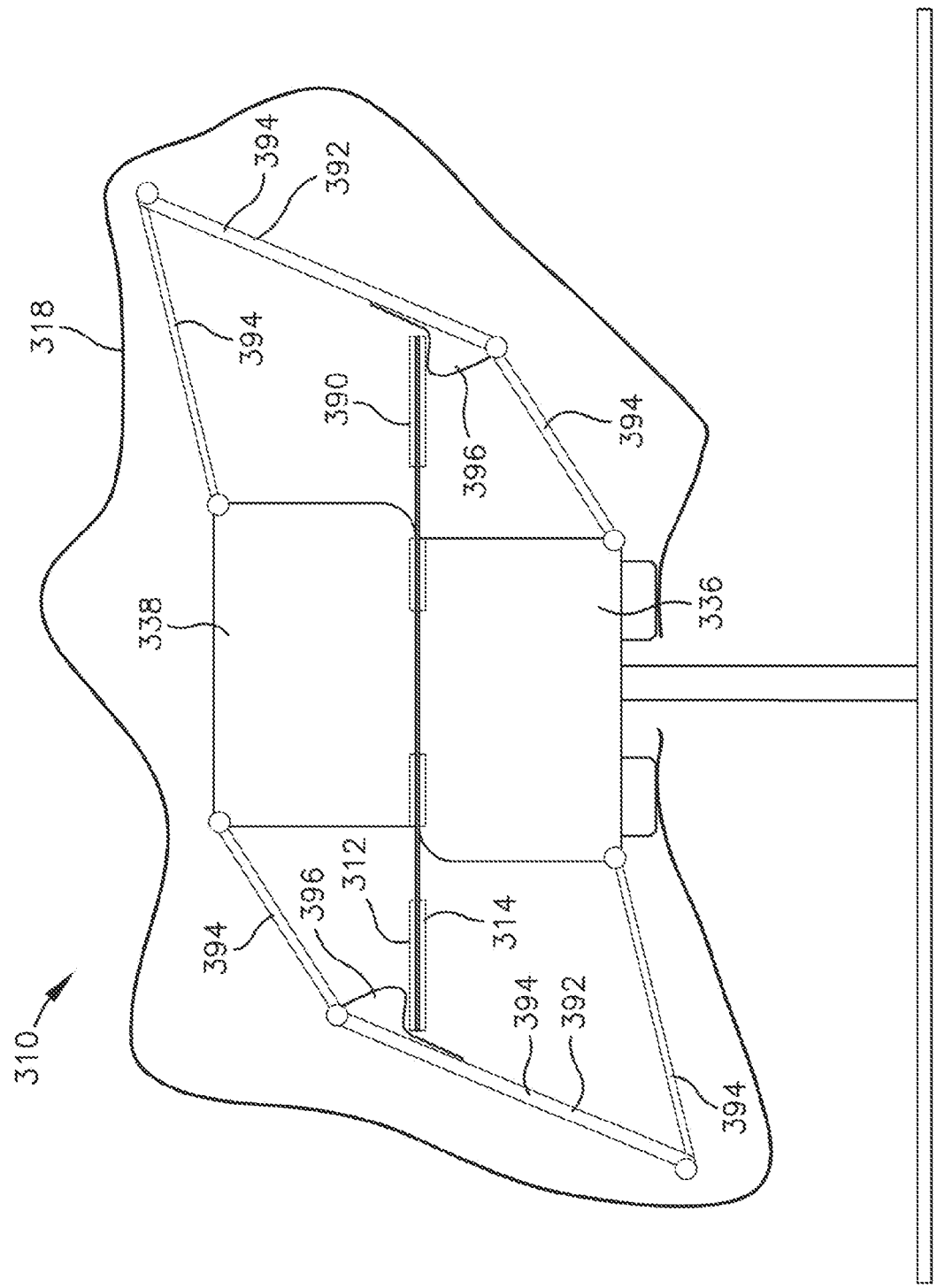
Figure 15:
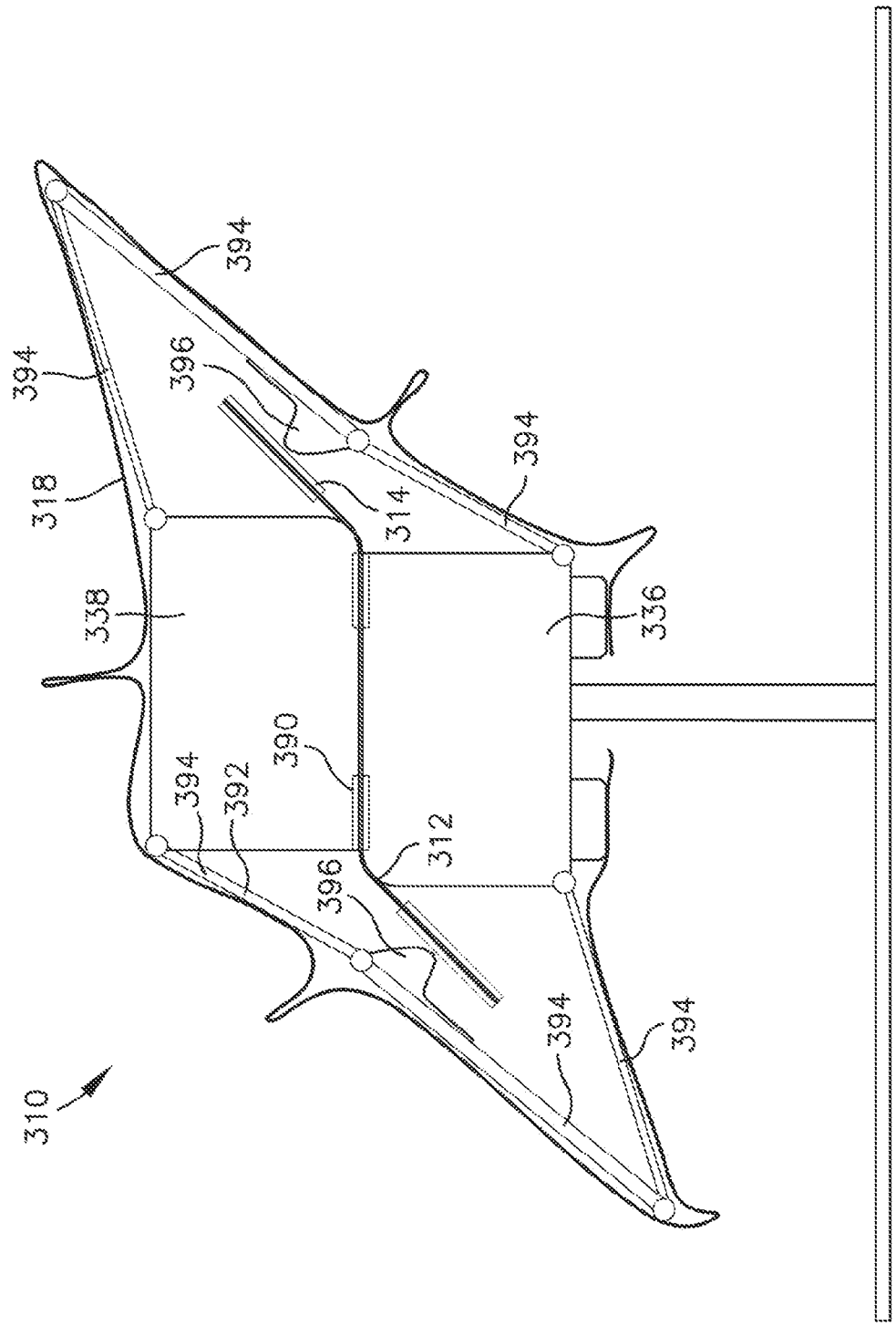
Figure 16:
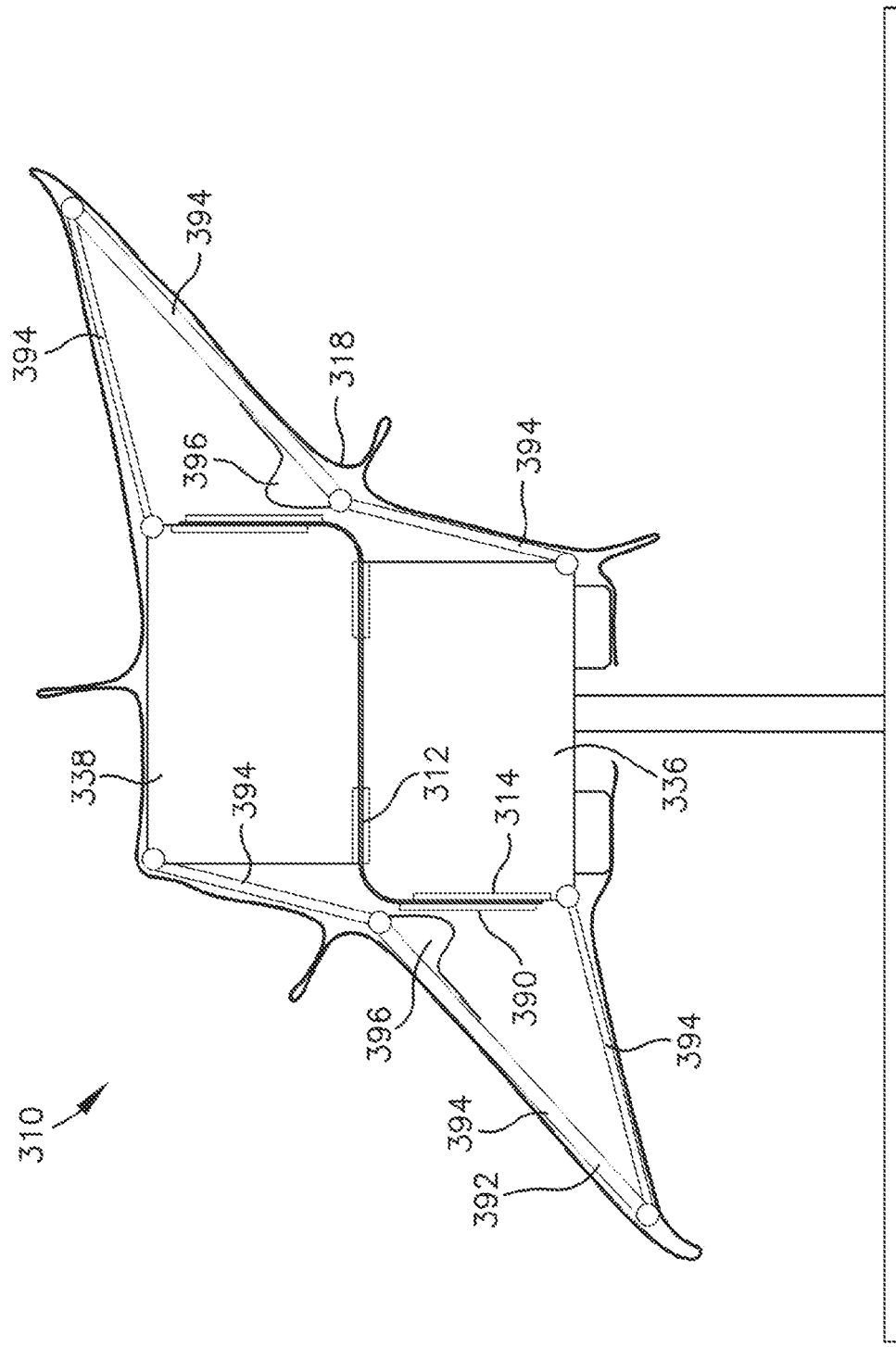
Figure 17:
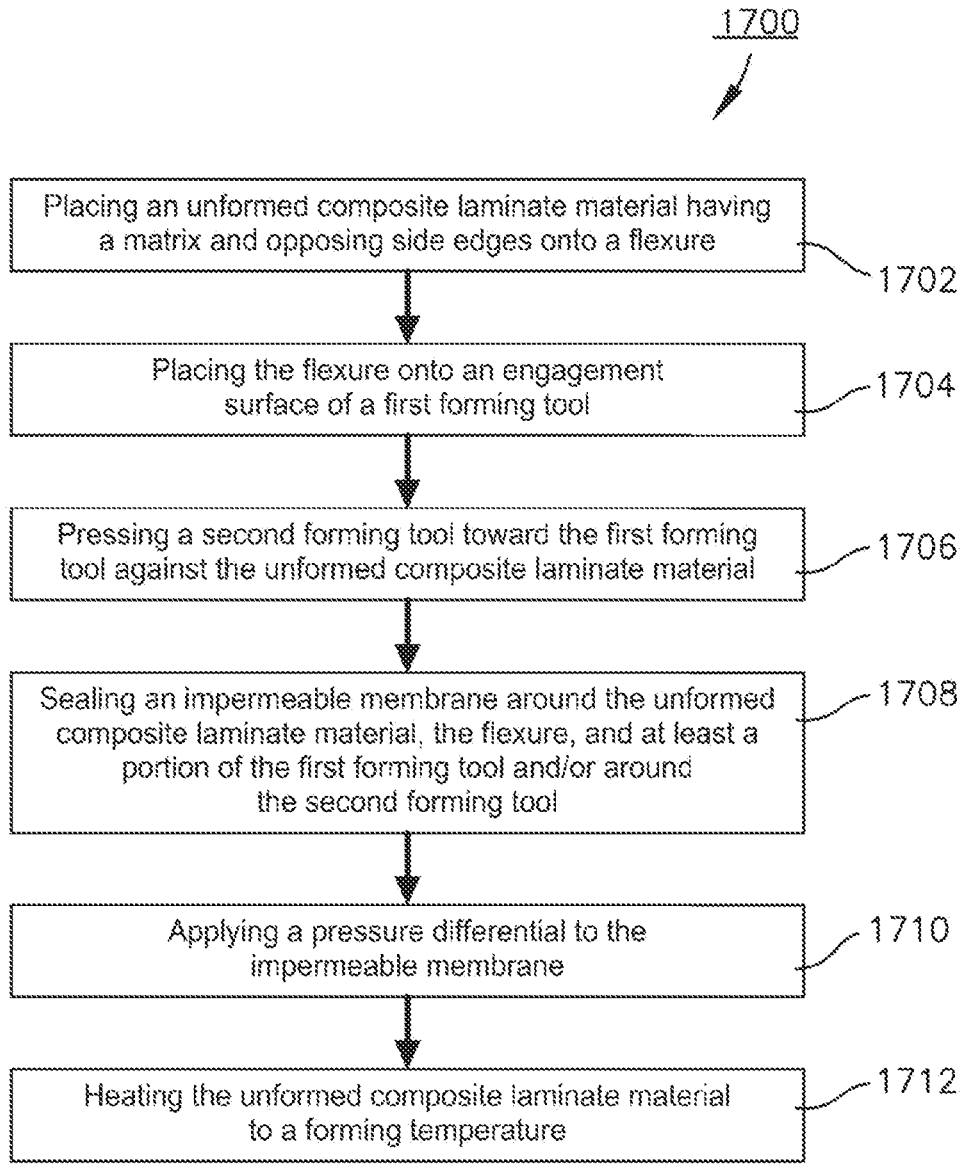

FIG. 7 is a side cross-sectional view of an alternative composite part forming system with a composite laminate positioned onto one forming tool with a substantially trapezoidal shaped protrusion extending from a substantially flat surface and having an impermeable membrane sealed around the composite laminate and the forming tool, depicting pinched edges of the composite laminate due to friction as a pressure differential presses the impermeable membrane toward the forming tool;

FIG. 8 is a side cross-sectional view of an improved alternative composite part forming system with a composite laminate positioned onto a flexure placed over a forming tool having a substantially trapezoidal shaped protrusion extending from a substantially flat surface, with an impermeable membrane sealed around the composite laminate, the flexure, and the forming tool, in accordance with embodiments of the present invention;

FIG. 9 is a side cross-sectional view of the improved alternative composite part forming system of FIG. 8 placed into an oven or autoclave, in accordance with embodiments of the present invention;

FIG. 10 is a side cross-sectional view of the improved alternative composite part forming system of FIG. 9, with a pressure differential beginning to press the impermeable membrane against the composite laminate such that the composite laminate and the flexure are pressed toward the forming tool, thereby bending the flexure about corners of the forming tool, in accordance with embodiments of the present invention;

FIG. 11 is a side cross-sectional view of the improved alternative composite part forming system of FIG. 10 with the impermeable membrane fully contracted and compressing the composite laminate and the flexure against surfaces of the forming tool, in accordance with embodiments of the present invention;

FIG. 12 is a top view of the flexure of the improved alternative composite part forming system of FIG. 8 placed over the forming tool and depicting darts or tapered slits at edges along a curved length of the flexure, in accordance with embodiments of the present invention;

FIG. 13 is an exploded cross-sectional side view of a composite part forming system having pivotally linked arms configured to properly position a composite laminate against forming tools, in accordance with embodiments of the present invention;

FIG. 14 is a schematic cross-sectional side view of the composite part forming system of FIG. 13 further including pressure intensifier protrusions contacting flexures thereof with the composite laminate therebetween, in accordance with an embodiment of the present invention;

FIG. 15 is a schematic cross-sectional side view of the composite part forming system of FIG. 14 with the flexures beginning to bend via mechanical force transferred from an impermeable membrane to a plurality of pivotally linked arms and the pressure intensifier protrusions attached thereto, in accordance with an embodiment of the present invention;

FIG. 16 is a schematic cross-sectional side view of the composite part forming system of FIG. 15 with the flexures fully bent and pressed against the first and second forming tools via the pressure intensifier protrusions and compression via the impermeable membrane, in accordance with an embodiment of the present invention; and FIG. 17 is a flow chart of a method for forming a composite part with multiple bends or curves in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

To form a composite part from unformed composite laminate material, shaping often occurs while heat is being applied, because the unformed composite laminate material tends to be stiff at room temperature and cannot be formed until heated to a particular forming temperature. Note that forming temperatures vary for different types of composite materials, but can range, for example, between 500-700 degrees Fahrenheit in some embodiments, and human operators cannot withstand such high temperatures. Thus, a method is needed for supporting a composite laminate during the melting or lowering of viscosity of its matrix and forming into a desired shape. Challenges of doing so without human intervention during heating, particularly when the shape includes multiple bends or curves, include sagging or draping of unsupported segments of the unformed composite laminate material when heated to a forming temperature as in FIG. 1, as well as unsupported segments of the unformed composite laminate material wadding up, wrinkling, and/or having vacuum bagging creep under the composite laminate as depicted in FIG. 2 while the unformed composite laminate material is at its forming temperature and being actuated via vacuum.

Figure 1:
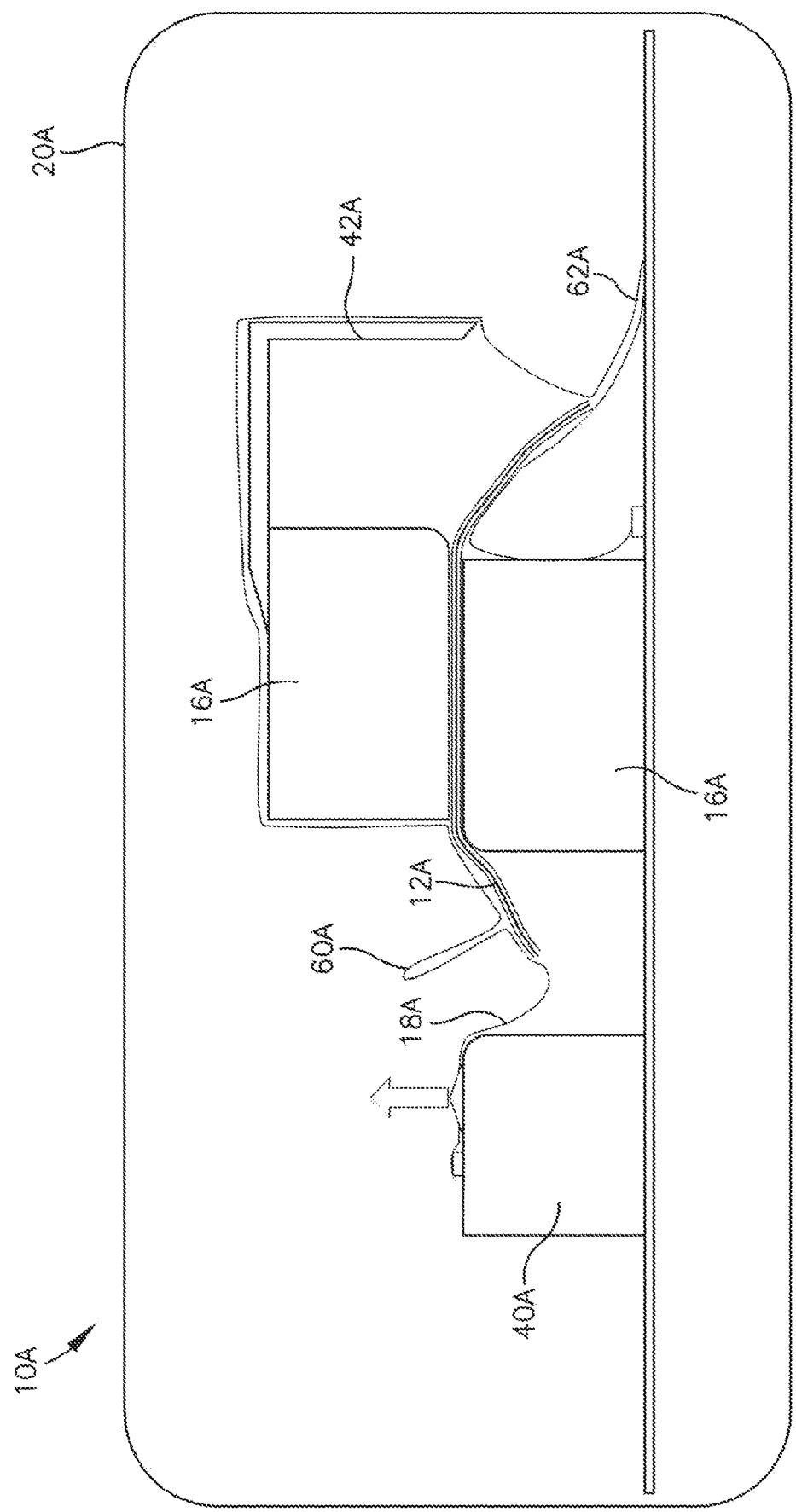
FIG. 1 is a side cross-sectional view of a composite part forming system with a composite laminate placed therein prior to application of a pressure differential pressing the composite laminate toward forming tools via a vacuum bag or impermeable membrane.

Specifically, FIG. 1 depicts an embodiment of a composite part forming system 10A with an unformed composite laminate material 12A, forming tools 16A, an impermeable membrane 18A, and an oven 20A or autoclave. The unformed composite laminate material 12A is between the forming tools 16A and has the impermeable membrane 18A formed around and attached to one of the forming tools 16A or a shielding and/or base of the forming tools. When heat is applied via the oven 20A, the unformed composite laminate material 12A begins to sag and drape, in a manner that does not form the desired part in this configuration.

To solve this issue, the impermeable membrane has pleats 60A,62A and is formed over strategically-placed impermeable membrane shields 40A,42A in order to press one side edge region of the draping and now formable unformed composite laminate material 12A downward against a lower one of the forming tools, and another opposing side edge region of the draping and formable unformed composite laminate material 12A upward against an upper one of the forming tools.

Figure 2:
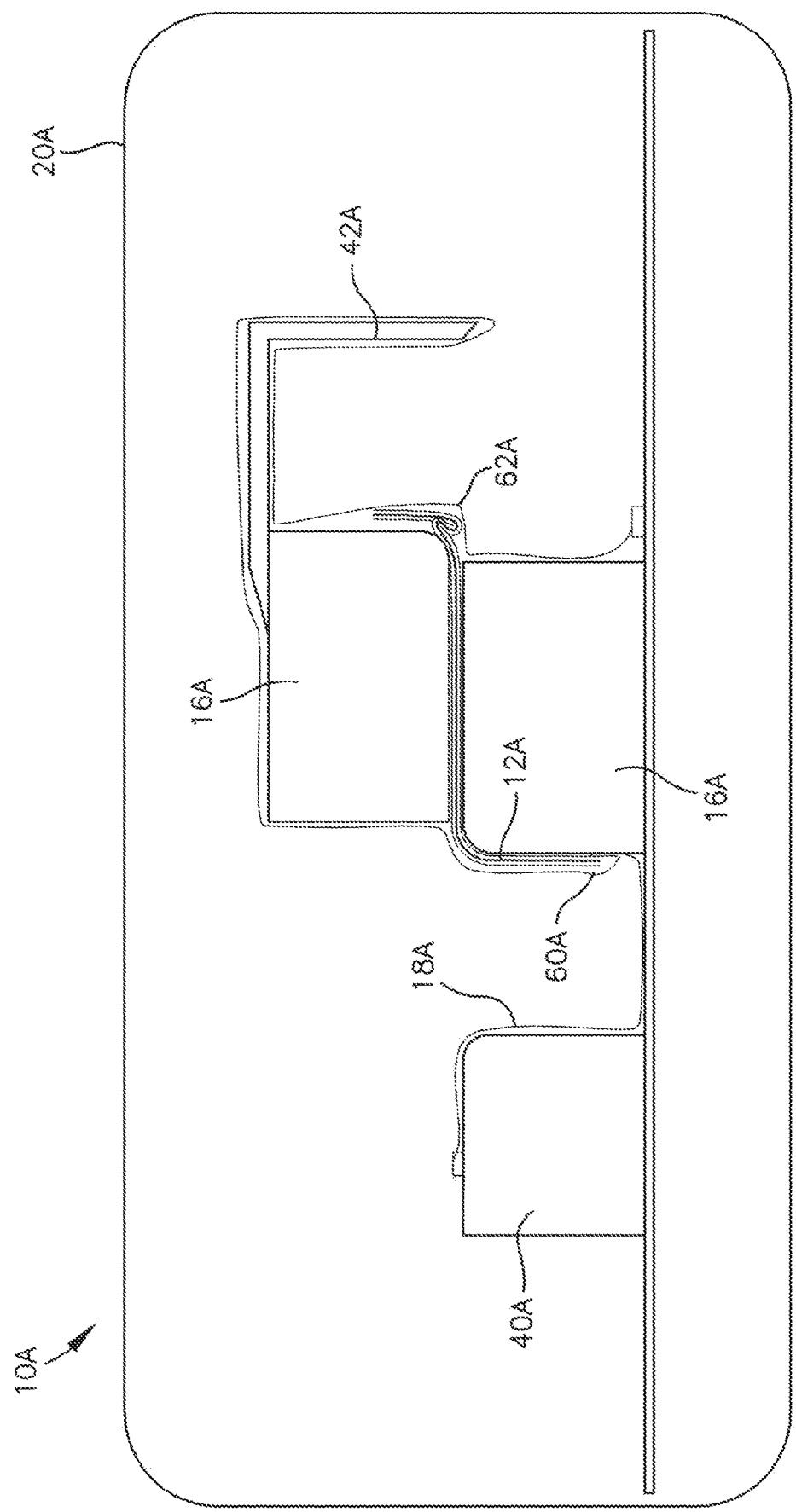
FIG. 2 is a side cross-sectional view of the composite part forming system of FIG. 1 after application of the pressure differential, depicting resulting undesirable defects in the composite laminate.

Specifically, as depicted in FIG. 2, once a pressure differential is applied to the impermeable membrane 20A, opposing side edge regions of the draping and formable unformed composite laminate material 12A do begin to move into a desired configuration (e.g., a Z-stringer cross section). Unfortunately, due to the draping at this stage of formability, the impermeable membrane is free to get suctioned under the unformed composite laminate material 12A (between one of the forming tools 16A and the unformed composite laminate material 12A) which can cause part defects. Additionally or alternatively, as depicted in FIG. 2, the unformed composite laminate material 12A being pressed upward by the impermeable membrane may slip downward due to gravity and wad up before being fully compressed against one of the forming tools 16A. When manufacturing defects such as these occur, the part is not usable for aircraft construction.

To address the disadvantages described above, an improved composite part forming system 10 is depicted in FIGS. 3-6. Specifically, the improved system 10 for performing the methods described herein comprises some of the elements of the system in claims 1-2, but additionally includes a flexure 14 for supporting an unformed composite laminate material 12 during shaping and/or curing, as described in more detail below. Specifically, in some embodiments, the system 10 for forming a composite part with multiple bends or curves, includes the unformed composite laminate material 12, the flexure 14, one or more forming tools 16, and an impermeable membrane 18. Additionally, in some embodiments, the system 10 includes a heat source such as an autoclave or oven 20 into which the other components of the system 10 can be placed for heating of the unformed composite laminate material 12 for curing as described herein.

The unformed composite laminate material 12 has a matrix and opposing side edges. For example, the unformed composite laminate material 12 has a plurality of terminal edges and comprises one or more composite plies (e.g., semi-crystalline or amorphous thermoplastic or thermoset composite plies) stacked together to form a panel or laminate which then is heated, formed and consolidated to form a final composite part. In some embodiments, the unformed composite laminate material 12 includes a reinforcement fiber and the matrix (e.g., a thermoplastic matrix resin or a partially cured thermosetting resin). For example, the matrix or thermoplastic matrix resin can be one or more of: polyaryletherketone (PAEK), polyetherketoneketone (PEKK), polyetheretherketone (PEEK), polyphenylene sulfide (PPS), Polyethylenimine (PEI), and the like. The unformed composite laminate material 12 is generally drapable when heated to a forming temperature (e.g., a temperature substantially lower than the curing temperature), allowing the unformed composite laminate material 12 to be formed into a variety of shapes via the methods described herein. The forming temperature is dependent on a melting or softening point of the matrix or resin used in the unformed composite laminate material 12. Specifically, the forming temperature is typically at, above, or proximate to the melting or softening point of the matrix. For example, the melting or softening point of the matrix may be the melting point of a thermoplastic matrix or the softening point of a thermosetting matrix in which the thermosetting matrix viscosity is lowered sufficiently for shaping/forming. The unformed composite laminate material 12 may otherwise have any size, shape, and/or number of terminal edges without departing from the scope of the technology described herein.

In various embodiments, the flexure 14 is a yieldable and/or bendable material with a higher melt temperature than the forming temperature of the unformed composite laminate material 12 and a sufficient percentage of elongation (e.g., at least approximately 1% elongation or more at the curing/processing temperature used to form or cure the composite part) to avoid cracking when bent as described herein. For example, the flexure 14 could be made of steel with 5-10% elongation. The flexure 14 is configured to bend around corners, curvatures, or protrusions of the forming tools 16 when pressure is applied to portions thereof. The flexure 14 can be, for example, a bendable metal or plastic with a higher melt temperature than the melting or softening temperature of the matrix (e.g., PEEK flexures). Alternatively, the flexure 14 can be a combination of such materials. In other example embodiments, a shape memory alloy with a higher melt temperature that is bendable under pressure can be used such that after use it can be returned to its original shape via application of another heat cycle. However, other bendable materials can be used without departing from the scope of the technology as described herein, as long as these other bendable materials are capable of withstanding a large degree of deflection without cracking or breaking. The flexure 14 can initially be substantially planar along a length thereof and between two opposing side edges, at least prior to bending thereof during forming of the unformed composite laminate material 12 as later described herein. The unformed composite laminate material 12 is laid over the flexure 14, such that plies of the unformed composite laminate material 12 are stacked on top of the flexure.

That is, the flexure 14 serves as a support surface for the unformed composite laminate material 12 prior to forming thereof and provides a sufficiently smooth forming surface for the laminate upon solidification or cure. The flexure 14 is configured to bend during formation of the composite part as later described herein.

Figure 3:
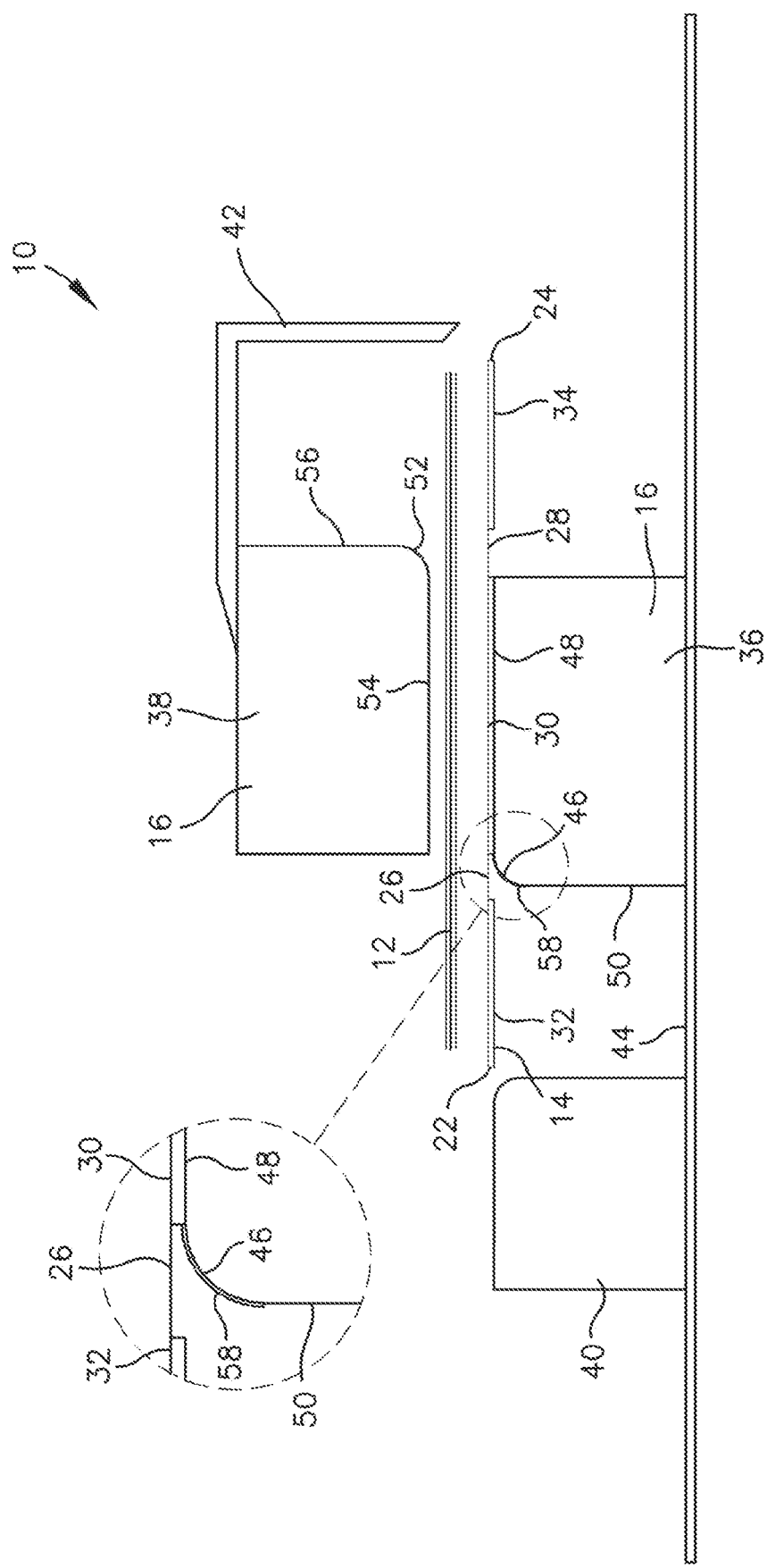
FIG. 3 is a side cross-sectional exploded view of an improved composite part forming system with a composite laminate positioned to be placed onto a flexure between two forming tools, in accordance with embodiments of the present invention.

The flexure 14, in some embodiments, has opposing side edges 22,24 and one or more thinned regions 26,28 between the opposing side edges 22,24. For example, as depicted in FIG. 3, the flexure 14 can have at least two thinned regions 26,28 between the opposing side edges 22,24, forming therebetween a middle segment 30, with a first end segment 32 and a second end segment 34 each extending between different ones of the two thinned regions 26,28 and different ones of the opposing side edges 22,24. For example, the first end segment 32 can extend between a first one of the two thinned regions 26 and a first one of the opposing side edges 22, while the second end segment 34 can extend between a second one of the two thinned regions 28 and a second one of the opposing side edges 24. The middle segment 30, the first end segment 32, and the second end segment 34 have thicknesses greater than the thinned regions 26,28. In some embodiments, the thinned regions 26,28 are each locally thinned, depressed, and/or otherwise each have a reduced thickness in comparison with regions or segments adjacent to the thinned regions 26,28. The thinned regions 26,28 each form a line of weakness, a compliant mechanism, or a living hinge, allowing for deformation in these thinned regions more easily than in the non-thinned regions like the middle segment 30, the first end segment 32, and the second end segment 34. Note that there may be more thinned regions than depicted herein without departing from the scope of the technology herein. Particularly, for parts with additional bends or curves, a thinned region may be aligned with each of the corresponding bends or curves in the forming tools. Surfaces of the flexure 14 facing the unformed composite laminate material 12 can be, in some embodiments, substantially planar, with the thinned regions 26,28 made by notches formed into opposite surfaces of the flexure 14 facing away from the unformed composite laminate material 12.

The forming tools 16 can include a first forming tool 36, a second forming tool 38, one or more impermeable membrane shields 40,42, and/or a base 44 as described herein. One embodiment of the forming tools 16 includes the first forming tool 36 and the second forming tool 38 depicted in FIG. 3. For example, the first forming tool 36 depicted in FIG. 3 has a first corner 46, a first engagement surface 48, and a first side surface 50 separated from the first engagement surface 48 by the first corner 46. Likewise, the second forming tool 38, as depicted in FIG. 3, can have a second corner 52, a second engagement surface 54, and a second side surface 56 separated from the second engagement surface 54 by the second corner 52 of the second forming tool 38. The first corner 46 and the second corner 52 described herein can be rounded or non-rounded corners without departing from the scope of the technology described herein or can refer to other such curvatures. Likewise, the first and second corners 46,52 can be formed between surfaces that are not joined at right angles without departing from the scope of the technology herein. In some embodiments, the first corner 46 and/or the second corner 52 include a build-up protrusion 58 sized and shaped to mate with one of the thinned regions 26,28. For example, the build-up protrusion 58 depicted in FIGS. 3-6 are configured for providing physical support to the thinned region 26 being pressed against the first corner 46.

When the unformed composite laminate material 12 and the flexure 14 is placed onto the first forming tool 36, a portion of a surface of the flexure 14 is positioned onto the first engagement surface 48 of the first forming tool 36. For embodiments also including the second forming tool 38, as in FIGS. 3-6, at least one of the first and second forming tools 36,38 is actuatable toward the other of the first and second forming tools 36,38 such that the first and second engagement surfaces 48,54 are movable closer and further apart from each other. In this manner, the flexure 14 and the unformed composite laminate material 12 is pressed between the first and second forming tools 36,38. This actuation can be manually controlled by one or more users or automated equipment, lifting or otherwise hoisting the second forming tool 38 over and then down onto the first forming tool 36 using, for example, indexing components (e.g., a matching pin and corresponding hole) to assist with the first and second forming tools 36,38 aligning properly for a desired composite part shape. The pressure differential across the impermeable membrane will also function to apply a compacting pressure on the composite laminate equal to the pressure on the protruding portions of the composite laminate.

Figure 4:
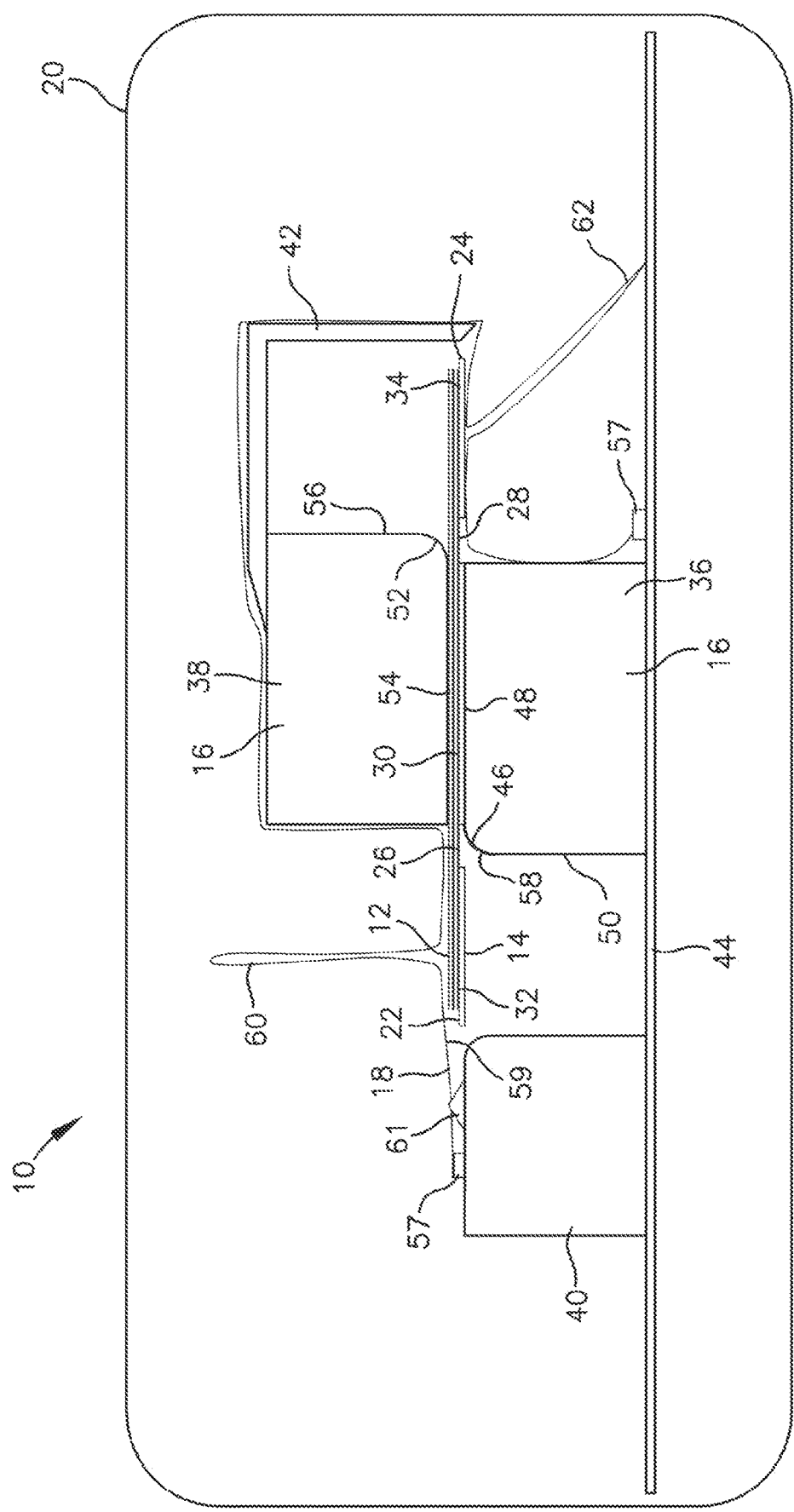
FIG. 4 is a side cross-sectional view of the improved composite part forming system of FIG. 3 placed into an oven or autoclave and with an impermeable membrane sealed around the composite laminate, the flexure, and the two forming tools.

In general, both the first and second impermeable membrane shields 40,42 are located within the sealed impermeable membrane 18 and are sized, spaced, and configured for preventing the impermeable membrane 18 from sliding between the flexure 14 or the unformed composite laminate material 12 and the first side surface 50 or the second side surface 56 during the applying of a pressure differential as described herein. As depicted in FIGS. 3-6, the impermeable membrane shields 40,42 can include a first impermeable membrane shield 40 and/or a second impermeable membrane shield 42. The first impermeable membrane shield 40 may extend upward from the base 44. The base 44 may be a rigid base plate or other such rigid impermeable surface joined at a base of the first forming tool 36 and at a base of the first impermeable membrane shield 40. The first impermeable membrane shield 40 is laterally spaced a distance apart from the first forming tool 36. For example, the first impermeable membrane shield 40 may protrude upward from the base 44 to a height approximately equal to a height of the first forming tool 36, such that an upper surface of the first impermeable membrane shield 40 is approximately level with the first engagement surface 48. In some embodiments, the impermeable membrane 18 extends over and/or is sealed against the first impermeable membrane shield 40 (e.g., the upper surface of the first impermeable membrane shield 40, as depicted in FIG. 4). The first impermeable membrane shield 40 is depicted as having a substantially rectangular or square cross-section. However, the first impermeable membrane shield 40 may have other sizes, shapes, or configurations without departing from the scope of the technology described herein. The impermeable membrane 18 can be sealed to a top surface of the first impermeable membrane shield 40, as depicted in FIG. 4. Alternatively, the impermeable membrane 18 can extend over the first impermeable membrane shield 40 and be sealed to the base 44 or base plate, such that everything between the impermeable membrane 18 and the base 44 is sealed therebetween.

In some exemplary embodiments, the second impermeable membrane shield 42 as depicted in FIG. 3 extends laterally from the second side surface 56 of the second forming tool 38 and has a length greater than a length of a portion of the flexure 14 between the second corner 52 and at least one of the opposing side edges 22,24 of the flexure 14 (e.g., the length of the second end segment 34 of the flexure 14). For example, the second impermeable membrane shield 42 may be an angled flange extending in a right or aftward lateral direction from a top region of the second side surface 56 and then bending at approximately 90-degrees downward, with this downward portion extending downward by an amount substantially equal to a height of the second forming tool 38. The impermeable membrane 18 can extend over the second impermeable membrane shield 42 and then inward toward the first forming tool 36 in the embodiments depicted in FIGS. 4-6. Furthermore, the impermeable membrane 18 can be sealed to the first forming tool 36 and/or sealed to the base 44 or base plate as depicted in FIG. 4.

The impermeable membrane 18 can be, for example, a vacuum bag or another flexible sheet of material made of plastic or the like configured for sealing around at least a portion of the system 10 components described herein. Specifically, the impermeable membrane 18 can surround the unformed composite laminate material 12 and the flexure 14 as well as at least a portion of the forming tools 16 and can be sealed to the forming tools 16 and/or parts of itself to create an air-tight seal (e.g., via sealant 57, adhesive, reusable mechanical sealing devices, or the like). A breather sheet 59 or layer may also be included between the impermeable membrane and other component in accordance with composite bagging techniques known in the art.

Furthermore, due to its flexibility and the sealing described above, the impermeable membrane 18 is actuatable to compress the unformed composite laminate material 12 or the plies thereof via the pressure differential (e.g., pulling vacuum via a port 61 formed through the vacuum bag or otherwise reducing pressure within the impermeable membrane 18 via vacuum, autoclave, and/or the like). For example, the impermeable membrane 18 can be contracted toward the unformed composite laminate material 12 when air is removed from within the impermeable membrane 18 via a vacuum pump or the like, such that a pressure differential exists on either side of the impermeable membrane 18 (i.e., inside and outside). Other methods of introducing a pressure differential to contract the impermeable membrane 18 for shaping consolidation of the unformed composite laminate material 12 known in the art can be used without departing from the scope of the technology described herein.

In some embodiments, the impermeable membrane 18 is sealed around the unformed composite laminate material 12, the flexure 14, and the at least a portion of the first forming tool 36 as later described herein. In other embodiments, the impermeable membrane 18 is sealed around the second forming tool 38, the unformed composite laminate material 12, the flexure 14, and the at least a portion of the first forming tool 36. The impermeable membrane 18 under a pressure differential (e.g., vacuum drawn from a port extending therethrough) presses at least one portion of the unformed composite laminate material 12 and at least one portion of the flexure 14 against the first side surface 50 and presses at least one region of the flexure 14 against the first corner 46 of the first forming tool 36. Likewise, the impermeable membrane 18 under the pressure differential applied thereto can also press at least another portion of the unformed composite laminate material 12 against the second side surface 56 and press at least one other region of the flexure towards or against the second corner 52. For example, as depicted in FIGS. 5-6, at least a portion of the first thinned region 26 is pressed downward against the first corner 46 by the impermeable membrane 18 and at least a portion of the second thinned region 28 is pressed upward causing the unformed composite laminate material 12 over the second thinned region 28 to be pressed against the second corner 52.

In one example embodiment, the configuration of the impermeable membrane 18 in conjunction with the forming tools 16 and the various shields described herein can form a Z-stringer using the tooling depicted in FIGS. 3-6. The term Z-stringer is well known in the art of aerospace manufacturing and refers to a structural component with an elongated and/or curved length and a cross-section having a middle segment, a first end segment, and a second end segment. The first and second end segments can be flanges angled in opposing directions from opposing ends of the middle segment. For example, the first end segment can extend substantially perpendicular from the middle segment in a first direction and the second end segment can extend substantially perpendicular from the middle segment in a second direction that is opposite the first direction.

In some embodiments, the impermeable membrane 18 comprises one or more pleats 60,62 formed therein and positioned over or under portions of the unformed composite laminate material 12 and the flexure 14 between one of the opposing side edges 22,24 of the flexure 14 and a surface of the flexure 14 (e.g., the middle segment 30) resting against the first engagement surface 48. For example, in FIGS. 4-5, a first pleat 60 is positioned above a portion of the unformed composite laminate material 12 that is resting on the first end segment 32 of the flexure 14. This allows the impermeable membrane's first pleat 60 to unfurl during its contraction (via application of the pressure differential) in a direction toward the unformed composite laminate material 12 that is resting on the first end segment 32, this unfurling thereby pressing the first end segment 32 and the unformed composite laminate material 12 resting thereon downward toward the first side surface 50. Likewise, a second pleat 62 is positioned below the second end segment 34 of the flexure 14. This allows the pleats 60,62 to unfurl during the impermeable membrane's contraction (via application of the pressure differential) in a direction toward the second end segment 34, this unfurling thereby pushing the second end segment 34 and the unformed composite laminate material 12 thereon upward toward the second side surface 56.

Figure 5:
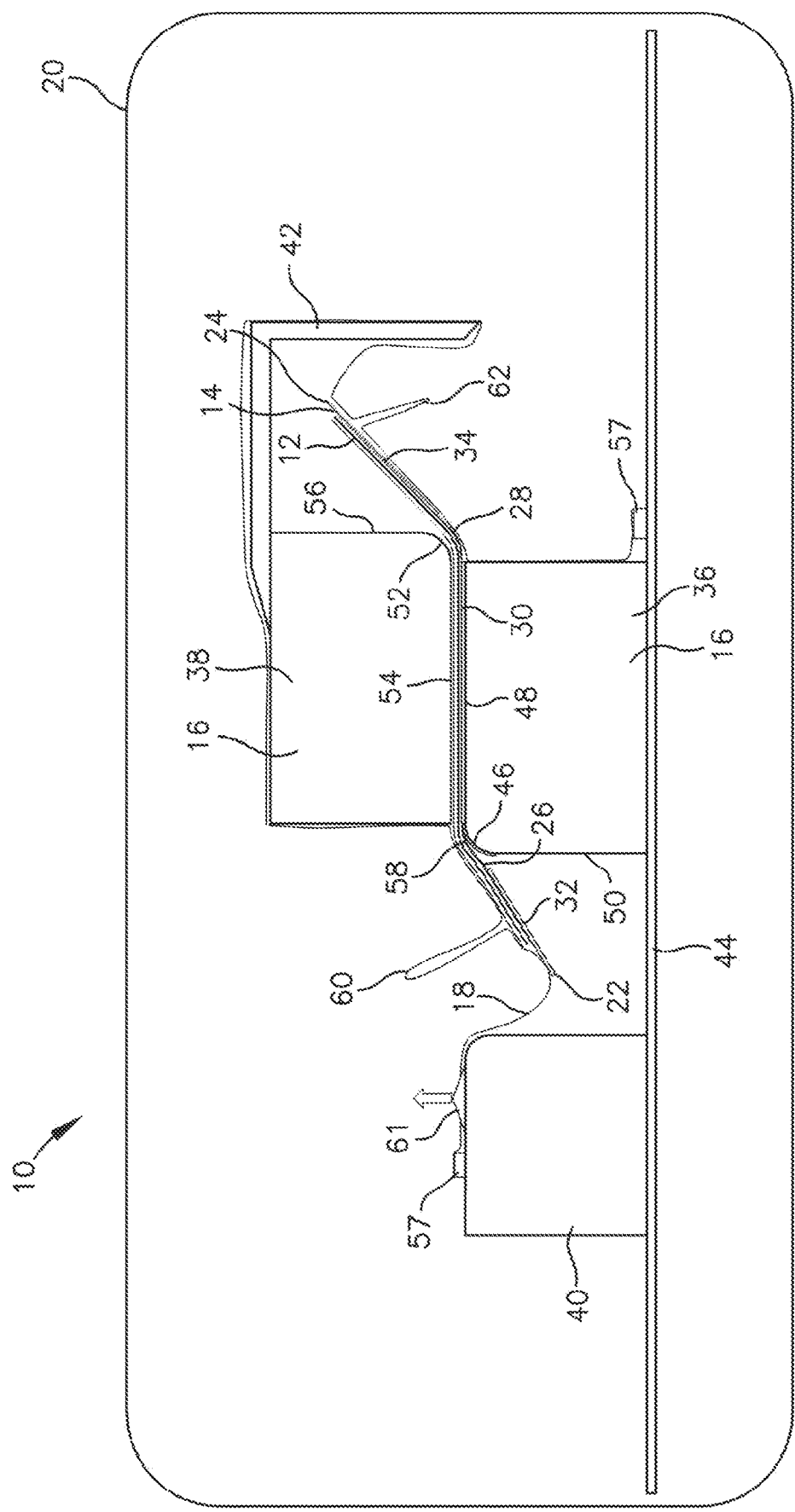
FIG. 5 is a side cross-sectional view of the improved composite part forming system of FIG. 4, with a pressure differential beginning to press the impermeable membrane toward the flexure and the composite laminate and toward one of the two forming tools, thereby bending the flexure about corners of the two forming tools, in accordance with embodiments of the present invention.
Figure 6:
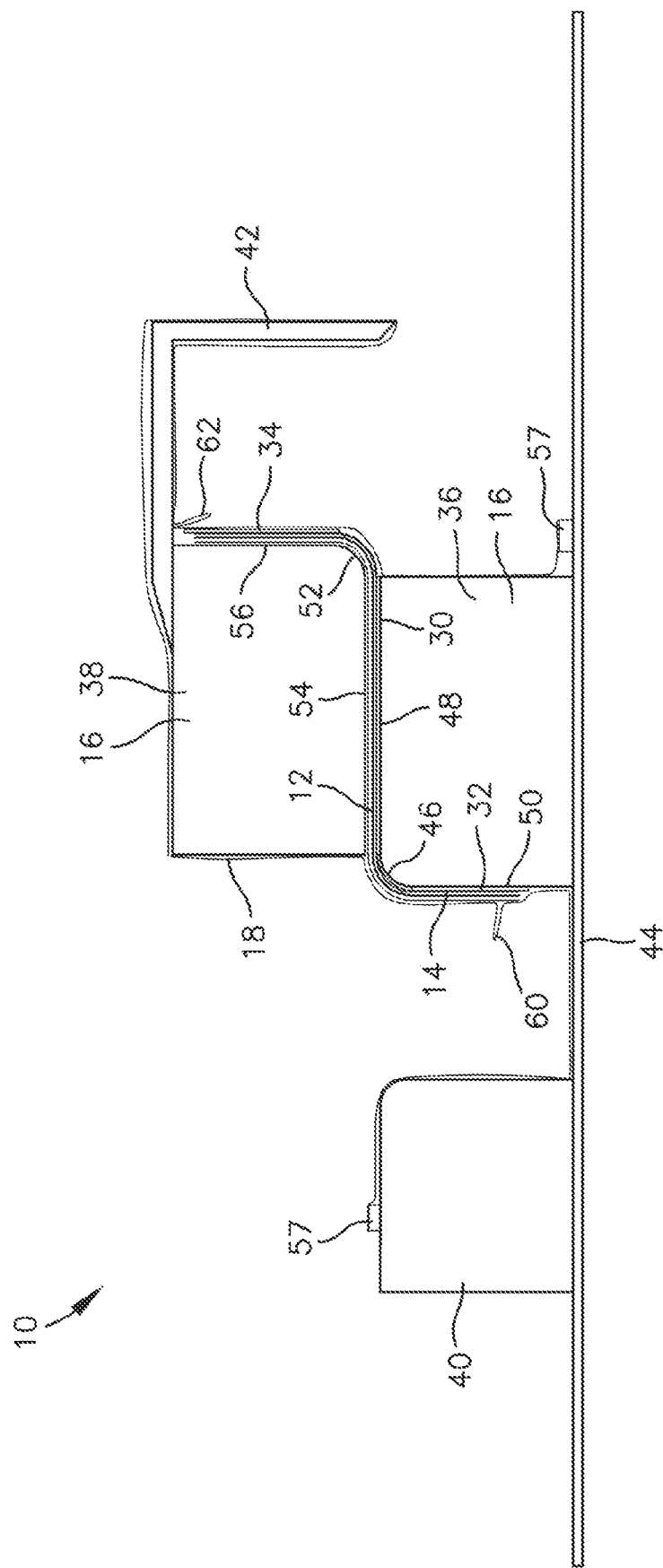
FIG. 6 is a side cross-sectional view of the improved composite part forming system of FIG. 5 following removal from the oven or autoclave and with full contraction of the impermeable membrane pressing bent end portions of the flexure and the composite laminate thereon against one of the two forming tools, in accordance with embodiments of the present invention.

The first pleat 60 in this example embodiment of FIGS. 4-5 can be centered at any location inward from the first one of the opposing side edges 22 approximately 10% of a length of the first end segment 32 of the flexure 14 to inward from the first one of the thinned regions 26 approximately 10% of the length of the first end segment 32 of the flexure 14. Alternatively, the first pleat 60 can be centered at any location inward from the first one of the opposing side edges 22 approximately 25% of the length of the first end segment 32 of the flexure 14 to inward from the first one of the thinned regions 26 approximately 25% of the length of the first end segment 32 of the flexure 14. Similarly, the second pleat 62 in this example embodiment of FIGS. 4-5 can be centered at any location inward from the second one of the opposing side edges 24 approximately 10% of a length of the second end segment 34 of the flexure 14 to inward from the second one of the thinned regions 28 approximately 10% of the length of the second end segment 34 of the flexure 14. Alternatively, the second pleat 62 can be centered at any location inward from the second one of the opposing side edges 24 approximately 25% of the length of the second end segment 34 of the flexure 14 to inward from the second one of the thinned regions 28 approximately 25% of the length of the second end segment 34 of the flexure 14. However, any location of the pleats 60,62 sufficient to allow the pleats 60,62 to unfurl during application of the pressure differential in a manner that presses a portion of the unformed composite laminate material 12 and/or the flexure 14 towards one of the forming tools 16 can be used without departing from the scope of the technology described herein.

The heat source can be the oven 20 (as noted above and schematically depicted here), an autoclave, or other sources of heat known in the art. The heat source can generate and provide at least one of radiant, convection, resistance, induction, or other similar types of heat that are suitable for heating the unformed composite laminate material. The amount of heat can be controlled in an automated or manual manner and may be configured to provide heat sufficient to melt or soften the matrix and/or form the unformed composite laminate material.

FIGS. 7-11 depict alternative embodiments of systems for forming composite parts, and particularly depict a forming tool having a different cross-sectional configuration. Specifically, an alternative composite part forming system 110A of FIG. 7 includes an unformed composite laminate material 112A, a forming tool 116A, an impermeable membrane 118A, and an oven 120A. The unformed composite laminate material 112A is identical or substantially identical to the unformed composite laminate 12 described above, the impermeable membrane 118A is identical or substantially identical to the unformed composite laminate 18, and the oven 120A is identical or substantially identical to the oven 20 described above and depicted in FIGS. 4 and 5. However, the forming tool 116A merely comprises one forming tool with a protrusion 170A extending therefrom and having a substantially trapezoidal shape with two rounded corners extending from a planar surface 172A of the forming tool 116A. The unformed composite laminate material 112A placed over the protrusion 170A drapes downward under the weight of gravity toward the planar surface once it reaches its forming temperature. The impermeable membrane 118A is sealed around the unformed composite laminate material 112A and the forming tool 116A and also, at the forming temperature, presses the unformed composite laminate material 112A downward toward the planar surface 172A when a pressure differential is applied to the impermeable membrane 118A.

However, FIG. 7 also depicts potential disadvantages with this particular configuration, namely that edges of plies of the unformed composite laminate material 112A can undesirably and prematurely be pinched off by the impermeable membrane 118A due to high friction between the unformed composite laminate material 112A and the planar surface 172A. This in turn prevents the unformed composite laminate material 112A from being fully pushed into concave corner regions formed where the protrusion 170A meets the planar surface 172A, and soft laminate forms a catenary shape under a distributed load applied by the impermeable membrane 118A with no forming tool against which this region of the unformed composite laminate material 112A can be compressed.

To overcome the problems depicted in FIG. 7, the embodiment depicted in FIGS. 8-11 are similar to the alternative system 110A, but instead additionally include a flexure to assist in preventing the premature pinching off described above in reference to FIG. 7. Specifically, FIGS. 8-11 depict an improved alternative composite part forming system 110 with unformed composite laminate material 112, a flexure 114, a forming tool 116, an impermeable membrane 118, and/or an oven 120 (or other alternative heat sources described herein). The unformed composite laminate material 112, the forming tool 116, the impermeable membrane 118, and the oven 120 are identical or substantially identical to the unformed composite laminate material 112A, the forming tool 116A, the impermeable membrane 118A, and the oven 120A described above. As in FIG. 7, The forming tool 116 of FIGS. 8-11 comprises a protrusion 170 extending from a planar surface 172, with the protrusion 170 having a substantially trapezoidal shape with two rounded corners 174,176 at a top or most outward-protruding region thereof and two concave corner regions 178,180 formed where the protrusion 170 meets the planar surface 176.

In the embodiments depicted in FIGS. 8-11, the flexure 114 is substantially identical to the flexure 14 described above, except that it comprises two, four, or more thinned regions 126, 128, 166, 168 that are similar or identical to the thinned regions 26,28 described above. As depicted, the unformed composite laminate part 112 is positioned onto the flexure 114 placed over the forming tool 116 having the substantially trapezoidal shaped protrusion 170 extending from the substantially planar surface 172, with the impermeable membrane 118 sealed around the unformed composite laminate material 112, the flexure 114, and the forming tool 116.

The flexure 114, as depicted in FIGS. 8 and 9, rests on a top surface (e.g., most outward-protruding region) of the protrusion 170 and supports the unformed composite laminate material 112 thereon prior to compression thereof by contraction of the impermeable membrane 118. In some embodiments in which there are four thinned regions 126, 128,166,168 two outer ones of the thinned regions 166, 168 are aligned to mate with and/or bend at concave corner regions 178,180 formed where the protrusion 170 meets the planar surface 172 of the forming tool 116. Furthermore, in such embodiments, two inner ones of the four thinned regions 126,128 are aligned to mate with and/or bend at the two rounded corners 174, 176 of the protrusion 170 of the forming tool 116. This mating and/or bending occurs when a force differential is applied, as depicted in FIGS. 10 and 11, and thereby presses the impermeable membrane 118 toward the forming surface 116. The impermeable membrane 120 can comprise one or more pleats 160,162 aligned above a region between opposing side edges 122,124 of the flexure 114 and either one of the two inner ones of the four thinned regions 126, 128. These pleats 160,162 can be, for example, placed approximately over the outer ones of the four thinned regions 166, 168 and operable to unfurl and thus press the outer ones of the four thinned regions 166, 168 toward the concave corner regions 178,180.

In some embodiments of the forming tool and/or the flexure, as in FIG. 10 or 11, a low friction coating 182 or other friction-reduction devices are provided. For example, the low friction coating 182 (e.g., release agent, release film, peel ply, or the like) can be applied to the forming tool 116, the flexure 114, and/or both, particularly at the opposing side edges 122,124 of the flexure 114 which contacts the planar surface 172 first, prior to the outer ones of the thinned regions 166, 168 bending into the rounded corner regions 178,180 of the forming tool 116. In another example embodiment, this low friction coating 182 can be replaced or supplemented with rollers, ball bearings, wheels, or other mechanical friction-reducing devices rollably and/or rotatably attached to the opposing side edges 122, 124 of the flexures 114 and/or embedded into the planar surface 172 of the forming tool 116. In yet another embodiment, the opposing side edges 122, 124 may be substantially rounded to provide for a reduction of friction between said opposing side edges 122,124 and the planar surface 172 of the forming tool 116. Some of the friction-reducing techniques described above can also be used in combination with each other. For example, if the opposing side edges 122, 124 are substantially rounded, the low friction coating 182 can be applied to the rounded opposing side edges to further assist in reducing friction between the forming tool 116 and the flexure 114. Other such friction-reduction devices and/or coatings can be used and/or applied to these and other embodiments without departing from the scope of the technology described herein.

For any of the embodiments described above, note that the opposing side edges of the flexures described herein may have a curved length between opposing first and second ends of the flexure, as depicted in FIG. 12. Specifically, the flexure 214 depicted in FIG. 12 is identical or substantially identical to the flexures 14,114 described above, except that the flexure 214 additionally includes darts or tapered slits 284 formed into the flexure 214 at the opposing side edges 222,224, each spaced apart from each other along a curved length of the flexure 214 between first and second opposing ends 286,288. In such an embodiment, a forming tool 216 likewise presents a curved length between opposing first and second ends. The darts or tapered slits 284 provide clearance by their ability to flex to expand and/or contract at their widest ends, thereby supporting the use of flexures when forming a curved composite part such as a stringer with an elongated curved length.

In yet another embodiment, as depicted in FIGS. 13-16, another alternative composite part forming system 310 comprises unformed composite laminate material 312, first and second forming tools 336,338, a first flexure 314, and an impermeable membrane 318 identical or substantially identical to the unformed composite laminate material 12, the first and second forming tools 36,38, the flexure 14, and the impermeable membrane 18 respectively, as described above and depicted in FIGS. 3-6. However, the alternative embodiment in FIGS. 13-16 additionally includes a second flexure 390 with the unformed composite laminate material 312 sandwiched 3 between the first and second flexures 314,390. Specifically, the first flexure 314 has thinned regions 326, 328 identical or substantially identical to the thinned regions 26,28 and the second flexure 390 is substantially identical to the first flexure 314 with identical thinned regions. Surfaces of the first flexure 314 and the second flexure 390 facing the unformed composite laminate material 312 can be, in some embodiments, substantially planar, with the thinned regions 326,328 made by notches formed into opposite surfaces of the first flexure 314 and the second flexure 390 facing away from the unformed composite laminate material 312.

Furthermore, the embodiment depicted in FIGS. 13-16 further includes a pressure intensifier 392 for mechanically pressing ends of the first and/or second flexures 314,390 toward the first or second forming tools 336,338. For example, as depicted in FIGS. 13-16, the pressure intensifier 392 can include a plurality of pivotally linked arms 394, each pivotally attached to each other and/or to one of the first or second forming tools 336,338. Furthermore, at least a portion of one of the plurality of pivotally linked arms 394 may have a pressure intensifier protrusion 396 configured for contacting at least one of two opposing side edges of the first or second flexures 314,390 and/or the unformed composite laminate material 312, thereby pressing at least one of the opposing side edges towards at least one of the first and the second forming tools 336,338. These pivotally linked arms 394 can be made of metal or any sufficiently-rigid material. The pressure intensifier protrusion 396 can be wedge-shaped or substantially triangular in some embodiments. Furthermore, one of the pressure intensifier protrusions 396 can contact a top surface of the second flexure 390 while another one of the pressure intensifier protrusions 396 can contact a bottom surface of the first flexure 314, thereby providing for pressing the opposing side edges or opposing end regions of the first and second flexures 314,390 in opposite directions relative to each other.

The impermeable membrane 318 can be sealed around the pressure intensifier 392 and sealed around the first and/or second forming tools 314,390, as depicted in FIG. 13, and the pressure intensifier protrusions 396 can be brought into contact with the first and/or second flexures 314,390 as in FIG. 14. When a pressure differential is applied to the impermeable membrane 318, as in FIGS. 15-16, the impermeable membrane 318 presses against and pivots one or more of the pivotally linked arms 392. A configuration or shape of the impermeable membrane 318 and/or arrangement of pleats formed in the impermeable membrane 318 may assist in pivoting the pivotally linked arms 392 in a proper direction such that the first and/or second flexures 314,390 are caused to bend in a desired direction. For example, for a Z-stringer as depicted, the desired direction for moving one of the opposing side edges of the flexures 314,390 is opposite the desired direction for moving the other one of the opposing side edges.

While the first and second flexures 314,390 are described in reference to the embodiments depicted in FIGS. 13-16, note that sandwiching the unformed composite laminate material 312 in this manner can be used in any of the embodiments described herein without departing from the scope of the technology herein. Additionally, the pressure intensifier 392 can be added to the embodiments depicted in FIGS. 3-6 at spaced-apart intervals thereof and/or at opposing ends of the first and second forming tools 36,38 of FIGS. 3-6, assisting in bending the first and/or second flexures 314,390 in the manner depicted (e.g., for a Z-stringer). Likewise, other elements of the various embodiments described and depicted herein can be combined, mixed, and matched without departing from the scope of the invention.

One example method of using the various systems described above for forming a composite part with multiple bends or curves is depicted in FIG. 17. Specifically, FIG. 17 depicts a listing of at least a portion of the steps of an exemplary method 1700 for forming a composite part with multiple bends or curves (e.g., a Z-stringer or a trapezoidal shaped stringer). The steps may be performed in the order shown in FIG. 17, or they may be performed in a different order or even simultaneously. Furthermore, some steps may be performed concurrently as opposed to sequentially. In addition, some steps may be optional or may not be performed.

The method 1700 for forming a composite part with multiple bends or curves includes a step of placing an unformed composite laminate material having a matrix as described herein and opposing side edges onto a flexure, as depicted in block 1702. As described above, the flexure can be a sheet of yieldable or bendable material with opposing side edges and a higher melt temperature than the melting or softening temperature of the matrix or than the forming temperature of the unformed composite laminate material. As used herein, the softening temperature of the matrix can be a temperature at which the matrix viscosity is lowered sufficiently for forming/shaping of the unformed composite laminate material.

The method 1700 further includes a step of placing the flexure (e.g., flexure 14) onto an engagement surface of a first forming tool, as depicted in block 1704. For example, the engagement surface can be, for instance, the engagement surface 48 of FIGS. 3-6 or the top surface or most outward-protruding region of the protrusion 170 as depicted in FIGS. 8-11. Likewise, the first forming tool can be any of the forming tools described herein, such as the first forming tool 36 of FIGS. 3-6 or the forming tool 116 of FIGS. 8-11.

The method 1700 can also optionally include a step of pressing a second forming tool (e.g., the second forming tool 38) toward the first forming tool against the unformed composite laminate material, as depicted in block 1706. However, note that in some embodiments, such as with the forming tool configurations depicted in FIGS. 8-11 where no second forming tool is included, this step can be omitted without departing from the scope of the technology described herein. As noted above, this can be accomplished by lifting or otherwise hoisting the second forming tool 38 over and then down onto the first forming tool 36 using, for example, indexing components (e.g., a matching pin and corresponding hole) to assist with the first and second forming tools 36,38 aligning properly for a desired composite part shape.

The method 1700 also includes a step of sealing an impermeable membrane around the unformed composite laminate material, the flexure, and at least a portion of the first forming tool, as depicted in block 1708. The impermeable membrane may be any of the impermeable membranes described herein (e.g., the impermeable membrane 18), and it may additionally surround also the second forming tool when using the first and second forming tools depicted in FIGS. 3-6. Sealing the impermeable membrane may further comprise placing a first pleat (e.g., pleat 60) of the impermeable membrane above the unformed composite laminate material and placing a second pleat (e.g., pleat 62) of the impermeable membrane below the flexure when using the system 10 of FIGS. 3-6 to accomplish this method step of block 1708.

Furthermore, the method 1700 also includes a step of applying a pressure differential to the impermeable membrane, as depicted in block 1710, thereby causing the impermeable membrane to press at least one portion of the unformed composite material and at least one portion of the flexure against the first forming tool (e.g., against the first side surface 50). This step 1710 can also thereby press at least one region of the flexure against the first corner the first forming tool (e.g., the first corner 46 or one of the two rounded corner regions 178,180 of the protrusion 170 of the forming tool 116). Step 1710 can also, using some of the system embodiments described herein, cause the impermeable membrane to press at least one portion of the unformed composite laminate material and at least one portion of the flexure toward and/or against the second forming tool (e.g., as depicted in FIGS. 5-6).

The method 1700, in some embodiments, includes a step of heating the unformed composite laminate material to a forming temperature (a melt point or softening temperature of the matrix that lowers the matrix viscosity sufficiently for forming thereof), as depicted in block 1712. This heating may be accomplished in an oven (e.g., oven 20) or autoclave, for example, as described in more detail above. However, other heating sources, such as some of those described herein, may be used without departing from the scope of the present technology. This heating may occur prior to and/or simultaneous to application of the pressure differential. As such, once the heating source heats the unformed composite laminate material to a forming temperature, processing temperature, and/or matrix melt temperature or softening temperature, the impermeable membrane under a pressure differential moves the flexure and the unformed composite laminate material towards the forming tools in accordance with the embodiments described above.

When the method step depicted in block 1712 is performed on the system depicted in FIGS. 13-16, at least a portion of one of the plurality of pivotally linked arms contacts at least one of the opposing side edges of the first and/or second flexures or the unformed composite laminate, pressing the at least one of the opposing side edges thereof towards at least one of the first and the second forming tools. Additionally or alternatively, other such linkage devices can be positioned around ends of the flexure and the unformed composite laminate material to mechanically control directions in which edge regions of the unformed composite laminate material are formed and further assist in preventing excess portions of the impermeable membrane from slipping between the unformed composite laminate or the flexure and the forming tools.

Using the steps of the method 1700, the composite laminate is consolidated into the desired shape and can then be transferred to a separate solidification tool or in some cases can be solidified over the flexure. Once the composite laminate is solidified or cured and subsequently cooled, the impermeable membrane can be vented and the result composite part can be removed from the forming tools and/or the flexure. In some embodiments, this removal can be made easier by providing a layer of release film, peel ply, or the like between the flexure and the unformed composite laminate material and/or the forming tools earlier in this method.

Advantageously, the systems, tooling, and methods described herein provide for vacuum bag forming of composite parts without typical bridging and wrinkling defects by using engineered flexures with strategically placed thinned areas to direct the bending locations. The systems described herein also reduce the compaction pressure during forming which would otherwise inhibit composite ply slippage and assists in controlling the bag pleat unfurling during forming. By making the bending locations of the flexures thin enough that they will deform at low pressures, the compaction pressure exerted on the laminate can be minimized. The support from the flexures herein prevents drooping of the unformed composite laminate material during the heating process and avoids delamination, deconsolidation, and ply shifting during the forming process.

Although the invention has been described with reference to example embodiments illustrated in the attached drawing figures, it is noted that equivalents may be employed and substitutions made herein without departing from the scope of the invention as described and claimed herein.

Having thus described one or more embodiments of the invention, what is claimed as new and desired to be protected by Letters Patent includes the following:

The invention claimed is:

1. A method for forming a composite part with multiple bends or curves, the method comprising:
    placing an unformed composite laminate material having a matrix and opposing side edges onto a flexure, wherein the flexure is a sheet of yieldable or bendable material with opposing side edges and a higher melt temperature than a melting or softening temperature of the matrix, wherein the flexure has a thinned region and first and second thicker regions on opposite sides of the thinned region, wherein the thinned region is depressed or has a reduced thickness in comparison with first and second thicker regions on opposite sides of the thinned region;
    placing the first thicker region of the flexure onto a first forming tool, the first forming tool having a first corner, a first engagement surface, and a first side surface separated from the first engagement surface by the first corner;

sealing an impermeable membrane around the unformed composite laminate material, the flexure, and at least a portion of the first forming tool; and applying a pressure differential to the impermeable membrane, thereby causing the impermeable membrane to press at least one portion of the unformed composite material and the second thicker region of the flexure against the first side surface and to press the thinned region of the flexure against the first corner of the first forming tool such that the flexure bends along the thinned region when the pressure differential is applied to the impermeable membrane and the first thicker region, the thinned region, and the second thicker region of the flexure are sandwiched between the unformed composite and the tool.

2. The method of claim 1, further comprising heating the unformed composite laminate material to a forming temperature in an oven or autoclave.

3. The method of claim 1, wherein a first impermeable membrane shield is laterally spaced apart from the first side surface, wherein the first impermeable membrane shield is located within the sealed impermeable membrane and sized, spaced, and configured for preventing the impermeable membrane from sliding between the flexure or the unformed composite laminate material and the first side surface during the applying of the pressure differential.

4. The method of claim 1, wherein the impermeable membrane comprises one or more pleats formed therein and each positioned over or under portions of the unformed composite laminate material and the flexure between one of the opposing side edges of the flexure and a surface of the flexure resting against the first engagement surface.

5. The method of claim 1, further comprising pressing a second forming tool toward the first forming tool against the unformed composite laminate material, wherein sealing the impermeable membrane further includes sealing the impermeable membrane around the second forming tool, the unformed composite laminate material, the flexure, and the at least a portion of the first forming tool, wherein the second forming tool has a second corner, a second engagement surface, and a second side surface separated from the second engagement surface by the second corner of the second forming tool.

6. The method of claim 5, further comprising a plurality of pivotally linked arms pivotally attached to each other and surrounded by the impermeable membrane, wherein at least a portion of one of the plurality of pivotally linked arms contacts at least one of the opposing side edges of the flexure or the unformed composite laminate, pressing the at least one of the opposing side edges towards at least one of the first and the second forming tools when the pressure differential is applied to the impermeable membrane.

7. The method of claim 5, wherein the step of sealing the impermeable membrane further comprises placing a first pleat of the impermeable membrane above the unformed composite laminate material and placing a second pleat of the impermeable membrane below the flexure.

8. The method of claim 1, wherein the flexure is made of steel with 5-10% elongation.

9. The method of claim 1, wherein the flexure is made of bendable plastic.

10. The method of claim 9, wherein the bendable plastic is PEEK.

11. The method of claim 1, wherein the flexure is made of shape memory alloy.

12. The method of claim 1, wherein the flexure is substantially planar prior to applying the differential pressure.

13. The method of claim 12, wherein applying the differential pressure bends the flexure around the first corner of the tool.

14. The method of claim 1, wherein the flexure has a composite-facing side and a tool-facing side, wherein the composite-facing side defines an uninterrupted smooth surface across the first thicker region, the thinned region, and the second thicker region.

15. The method of claim 14, wherein the tool-facing side has a surface defining an interruption at the thinned region.

16. A method for forming a composite part with multiple bends or curves, the method comprising:

placing an unformed composite laminate material having a matrix and opposing side edges onto a flexure, wherein the flexure is a sheet of yieldable or bendable material with opposing side edges and a higher melt temperature than a melting or softening temperature of the matrix;

placing the flexure onto a first forming tool, the first forming tool having a first corner, a first engagement surface, and a first side surface separated from the first engagement surface by the first corner;

sealing an impermeable membrane around the unformed composite laminate material, the flexure, and at least a portion of the first forming tool; and applying a pressure differential to the impermeable membrane, thereby causing the impermeable membrane to press at least one portion of the unformed composite material and at least one portion of the flexure against the first side surface and to press at least one region of the flexure against the first corner of the first forming tool;

the method further comprising pressing a second forming tool toward the first forming tool against the unformed composite laminate material, wherein sealing the impermeable membrane further includes sealing the impermeable membrane around the second forming tool, the unformed composite laminate material, the flexure, and the at least a portion of the first forming tool, wherein the second forming tool has a second corner, a second engagement surface, and a second side surface separated from the second engagement surface by the second corner of the second forming tool.

17. The method of claim 16, further comprising a plurality of pivotally linked arms pivotally attached to each other and surrounded by the impermeable membrane, wherein at least a portion of one of the plurality of pivotally linked arms contacts at least one of the opposing side edges of the flexure or the unformed composite laminate, pressing the at least one of the opposing side edges towards at least one of the first and the second forming tools when the pressure differential is applied to the impermeable membrane.

18. The method of claim 16, wherein the step of sealing the impermeable membrane further comprises placing a first pleat of the impermeable membrane above the unformed composite laminate material and placing a second pleat of the impermeable membrane below the flexure.

19. A method for forming a composite part with multiple bends or curves, the method comprising:

placing an unformed composite laminate material having a matrix and opposing side edges onto a flexure, wherein the flexure is a sheet of yieldable or bendable material with opposing side edges and a higher melt temperature than a melting or softening temperature of the matrix;

placing the flexure onto a first forming tool, the first forming tool having a first corner, a first engagement surface, and a first side surface separated from the first engagement surface by the first corner;

sealing an impermeable membrane around the unformed composite laminate material, the flexure, and at least a portion of the first forming tool; and applying a pressure differential to the impermeable membrane, thereby causing the impermeable membrane to press at least one portion of the unformed composite material and at least one portion of the flexure against the first side surface and to press at least one region of the flexure against the first corner of the first forming tool;

wherein the opposing side edges of the flexure extend a curved length between opposing first and second ends of the flexure, wherein darts or tapered slits are formed into the flexure at one or both of the opposing side edges of the flexure and are each spaced apart from each other along the curved length of the flexure.

* * * * *